United States Patent [19]
Hashimoto

[11] Patent Number: 4,630,726
[45] Date of Patent: Dec. 23, 1986

[54] TUBULAR BELT CONVEYOR AND A BELT ROLLING UP MEANS OF THE SAME

[75] Inventor: Kunio Hashimoto, Kitakyushu, Japan

[73] Assignees: Haruo Okazaki; Japan Pipe Conveyor Co., Ltd., both of Fukuoka, Japan

[21] Appl. No.: 606,664

[22] Filed: May 3, 1984

[51] Int. Cl.⁴ .............................................. B65G 15/08
[52] U.S. Cl. .................................................. 198/819
[58] Field of Search ......................... 198/819, 826, 825

[56] References Cited
U.S. PATENT DOCUMENTS
2,818,966  1/1958  Gill ....................................... 198/826

FOREIGN PATENT DOCUMENTS
0827538  4/1938  France ................................. 198/819
2061853  5/1981  United Kingdom ................ 198/819

Primary Examiner—Joseph E. Valenza
Assistant Examiner—D. Glenn Dayoan
Attorney, Agent, or Firm—Hayes, Davis & Soloway

[57] ABSTRACT

A tubular belt conveyor having an endless belt shaped substantially to a long tube by applying its elasticity for carrying materials by packing up them therein. The belt conveyor is provided with a belt rolling structure comprising a pressing roller which presses an end portion of the belt to inner downward direction, and the belt conveyor is further provided with three rolling-up rollers which support and press the tubular belt so that it may be smoothly rolled up.

1 Claim, 12 Drawing Figures

U.S. Patent   Dec. 23, 1986   Sheet 3 of 3   4,630,726
FIG. 9
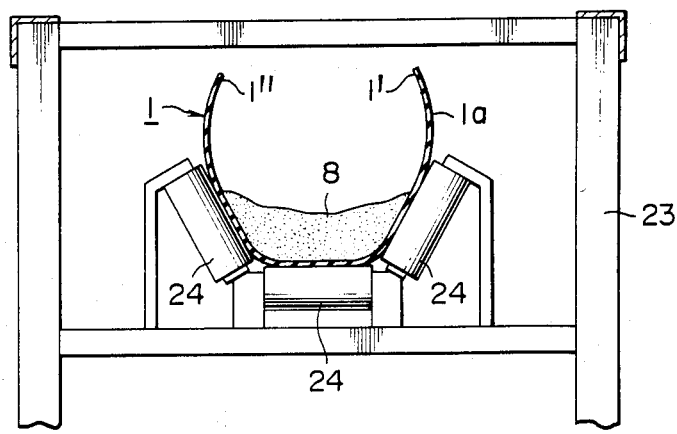
FIG. 10
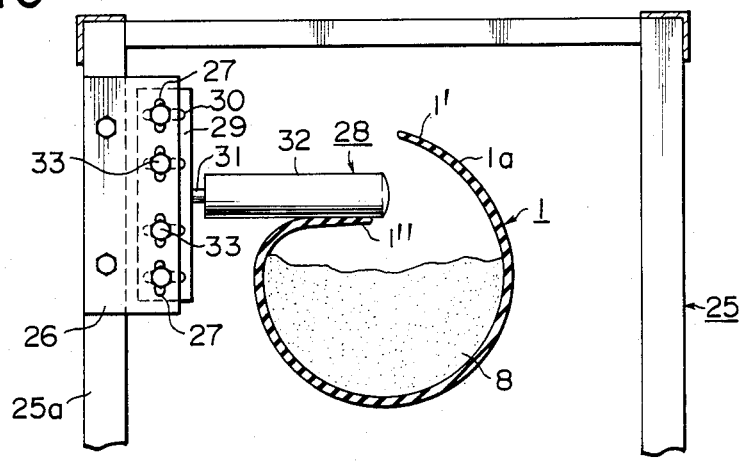
FIG. 11
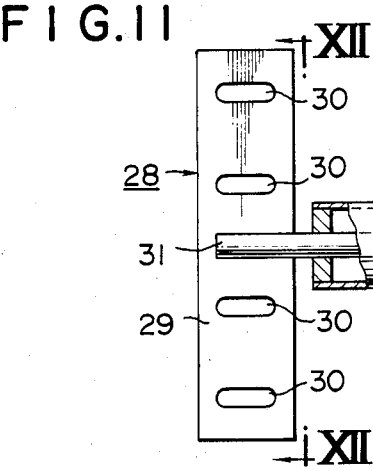
FIG. 12

TUBULAR BELT CONVEYOR AND A BELT ROLLING UP MEANS OF THE SAME

BACKGROUND OF THE INVENTION

This invention relates to a tubular belt conveyor having an endless belt the larger part of which is made to a tubular shape for carrying powdery materials by packing up them therein, and particularly relates to a supporting device for smoothly forming the endless belt to a tubular shape and a rolling up means for smoothly rolling up the larger part of the endless belt.

Conventionally, a tubular belt conveyor which is provided with an endless belt the larger part of which is formed to a tubular shape for carrying powdery materials without scattering them by packing up them wholly therein, which can carry those materials without being moistened by rain, being blown off by wind, even if it is installed in the outdoor, and which can be curved the carrying path freely, and can perform material carrying operation successively, even if the carrying path has steep inclination, has been already well-known.

In FIGS. 1 to 5 there is shown a conventional tubular belt conveyor. The reference number 1 designates an endless belt, for example, made of rubber which is, from manufacturing stage, bestowed liability, because of its natural elasticity to roll up itself, to form a tubular shape by overlapping both side end portions 1' and 1" with each other, and on a drive roller 2 arranged at the upper part of the belt conveyor and on a follower roller 3 located at the lower part thereof flattened parts of the belt are wound up.

The reference number 4 designates supporting frames which support the tubular formed part of the belt 1 at every predetermined intervals and guide it. Each of the supporting frame 4 is, as shown in FIG. 3, separated to two parts, an upper chamber 4a and a lower chamber 4b. In the inside of each of the chambers a plurality of belt shape maintaining rollers 5 (in the embodiment of the invention six rollers are provided) are disposed symmetrically so that they may be arranged on the circumference of a circle with approximately equidistance therebetween.

The belt 1 which is flattened on the lower follower roller 3 is gradually rolled up by self-rolling up liability caused by its elasticity and by introduction of a belt rolling up means which comprises a plurality of belt rolling-up rollers 6 disposed between the follower roller 3 and the belt shape maintaining rollers 5 at the lower end of the conveyor so that they may be arranged substantially on the circumference of a partial circle.

On the while the belt 1 packs up the materials to be carried which are fallen from a hopper 7, and the belt of going path 1a formed to a tubular shape passes through each of the upper chambers 4a of the respective supporting frames 4.

Then, the materials 8 to be carried are thrown onto a receiving tab 9, while the belt 1 is being travelled on the drive roller 2 and spreaded to a flattened plate shape by a belt spreading device (not shown) composed approximately in symmetrical relation with the above described belt rolling up means. The belt spreading device is disposed between the supporting frame 4 located at the front and the drive roller 2.

Next, same as the afore-described, the belt 1 is rolled up to a tubular shape and descends passing through each of the lower chambers 4b of the respective supporting frames 4. Then the belt 1 makes its rounds passing on the follower roller 3, after its being spreaded to form a flattened plate shape as same as the above described manner.

The tubular belt conveyor mentioned the above, in general, as shown in FIG. 4, both of the side end portions 1' and 1" of the belt 1 are smoothly overlapped immediately before the belt 1 enters to the circumference of the circle formed by the belt shape maintaining rollers 5 in the chamber located at the rearest position, and the belt 1 is completely rolled up when it passes through the circumference of the circle formed by the belt shape maintaining rollers 5.

However, as shown in FIG. 5 in the case of the materials 8 to be carried from the hopper 7, according to the amount of the materials 8 and physical property thereof, the marginal end portion of the inner side end portion 1" contacts with the inside of the outer side end portion 1', and when the belt 1 is rolled, those contact portions are frictionally moved, so that those portions are badly worn and extremely damaged.

In addition, in the case of extremity those contacting portions are puffed up with each other not to be smoothly rolled up to cause those end portions 1' and 1" to damage and life time of the tubular belt conveyor is remarkably shortened because of overstrains burdened on the belt shape maintaining rollers 5 at the lower part, the belt 1 and the drive means of the conveyor. In particular case there occurs even inverse overlapping with the upper and the lower side end portions.

SUMMARY OF THE INVENTION

With the foregoing the inventor of the present invention aims to eliminate the afore-described disadvantages of the conventional tubular belt conveyors.

Thus, the principal object of the present invention is to provide a belt pressing means for pressedly bending one side end of the belt inwardly.

Another object of the present invention is to provide a belt rolling up means which can smoothly overlap the interior surface of the outer side end of the tubular belt with the marginal end portion of the inner end side thereof so that the belt can be smoothly rolled up.

The above and other objects, features and advantages of the present invention can be easily understood from the following description and appended claims, taken in conjunction with the accompanying drawings.

BRIEF DESCRIPTION OF THE DRAWINGS

FIG. 9 is an enlarged longitudinal sectional view along IX—IX line shown in FIG. 7.

FIG. 10 is an enlarged longitudinal sectional view along X—X line shown in FIG. 7.

FIG. 11 is an enlarged partial front view of a belt pressing device according to the present invention, and FIG. 12 is a longitudinal sectional view along XII—XII line shown in FIG. 11.

DESCRIPTION OF THE PREFERRED EMBODIMENT

Figure 1:
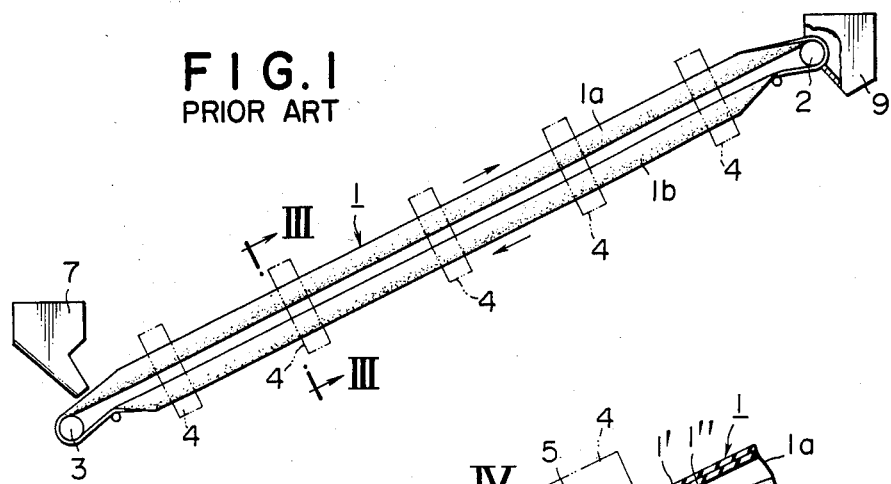
FIG. 1 is a rough sketch of side view of the conventional tubular belt conveyor.
Figure 2:
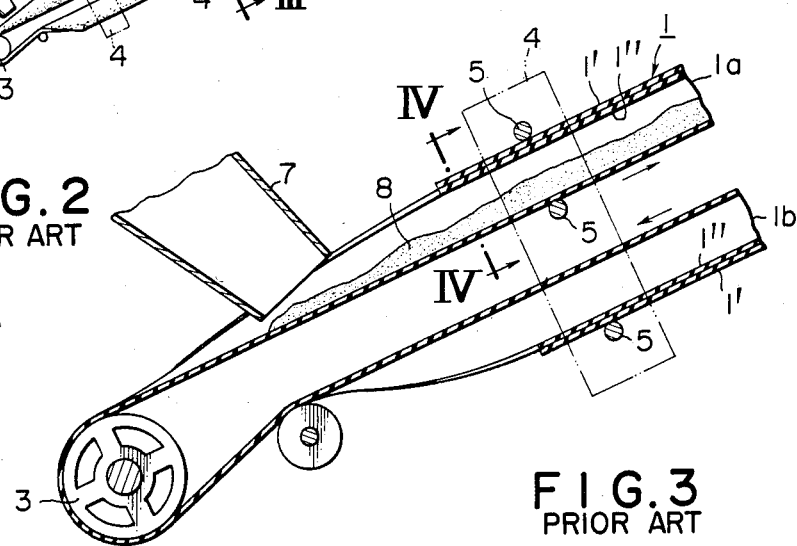
FIG. 2 is an enlarged longitudinal sectional view of the side portion in the vicinity of an inlet into which materials to be carried is thrown as shown in FIG. 1.
Figure 3:
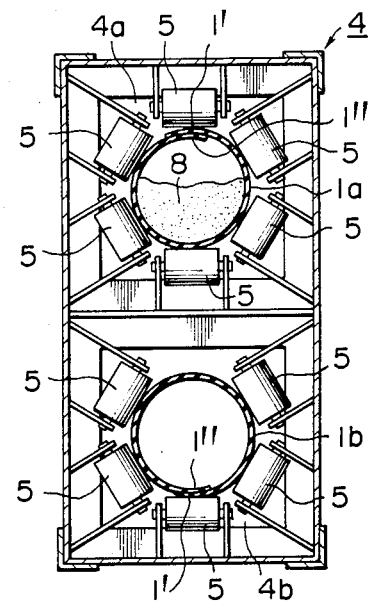
FIG. 3 is an enlarged longitudinal sectional view along III—III line shown in FIG. 1.
Figure 4:
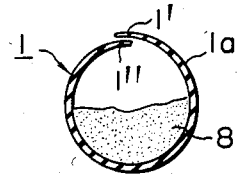
FIG. 4 is a longitudinal sectional view along IV—IV line shown in FIG. 2, which is being in successfully operated.
Figure 5:
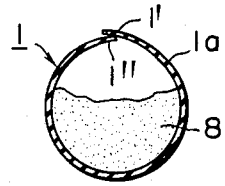
FIG. 5 is a longitudinal sectional view along IV—IV line shown in FIG. 2, which is being in wrongly operated, that is, in the state that those contacting portions are frinctionally puffed up.
Figure 6:
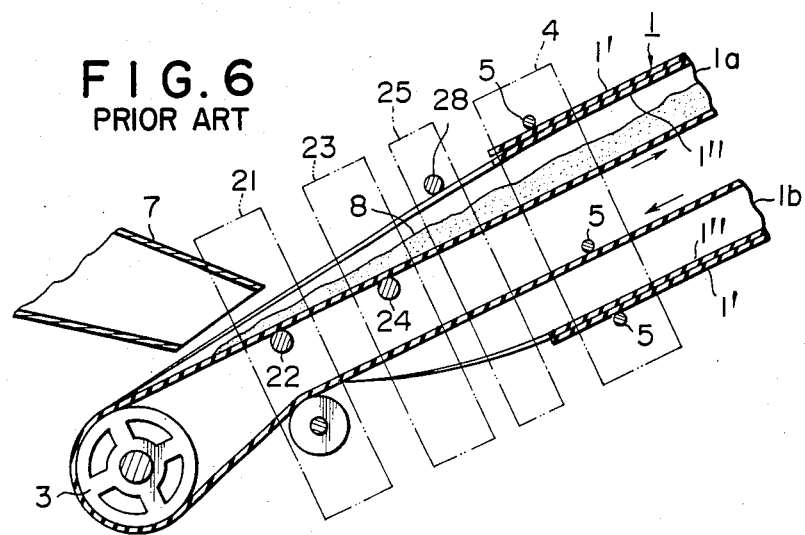
FIG. 6 is a plan view of the tubular conveyor shown in FIG. 2.

Referring to the drawings, i.e., FIGS. 6 to 12, there is shown a preferred embodiment of a tubular belt conveyor according to the present invention.

Figure 7:
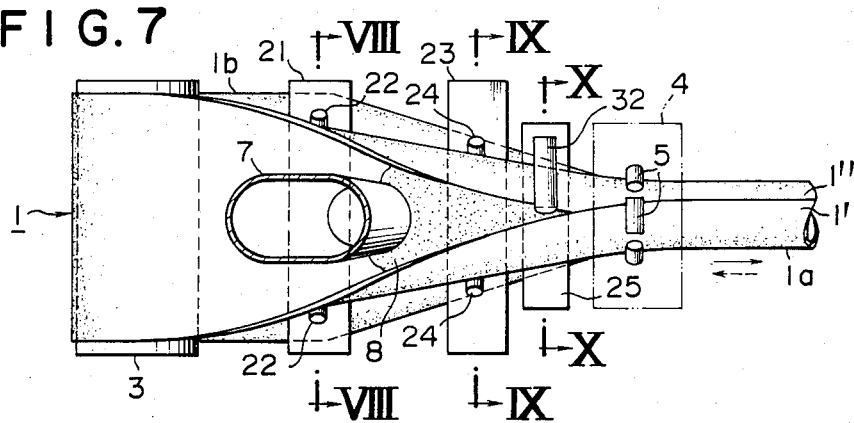
FIG. 7 is a plan view of a tubular belt conveyor according to the present invention.
Figure 8:
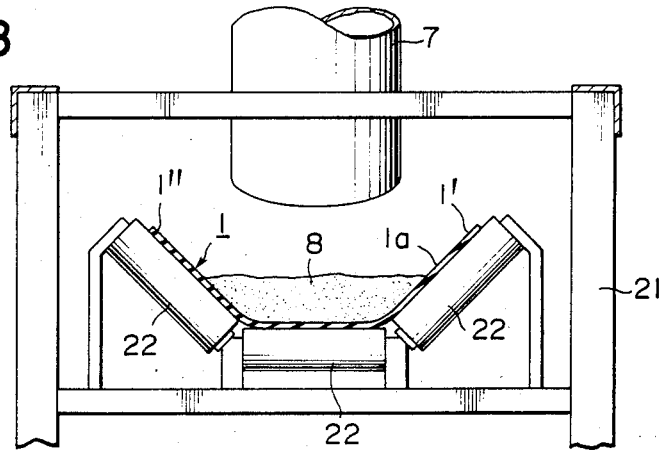
FIG. 8 is an enlarged longitudinal sectional view of the present invention along VIII—VIII line shown in FIG. 7.

As shown in FIG. 7 a first rolling frame 21 which surrounds the going path portion 1a of the belt 1 is disposed in the vicinity of the follower roller 3, and in the first rolling frame 21 there are arranged, as shown in FIG. 8, three rolling-up roller 22 so that they may substantially be arranged on a partial circumference, and among them the central rolling-up roller 22 is horizontally disposed, and remaining rollers 22, 22 on both sides are upwardly inclined with gentle angles (in general they are the same angle) in the outward directions (in this 45°). By these three rolling-up rollers, the underside of the going path 1a of the belt 1 which runs out of the follower roller 3 in a flattened form is supported.

In a second rolling frame 23 which is arranged ahead to the first rolling frame 21 in the belt advancing direction, there are also provided three rolling-up rollers 24. But in this frame the rolling-up rollers 24 of both sides are inclined steeply (in this embodiment the inclination angle is 60°).

The above described is similar to the belt rolling device of conventional tubular belt conveyor, but in the present invention there is provided a pressing frame 25 between the second rolling frame 23 and the supporting frame 4 which is disposed at the rearest position.

As shown in FIG. 10 at the upper portion of a longitudinal frame 25a of the pressing frame 25, a fitting plate 26 which is longer in the longitudinal side than the lateral side is securedly mounted, and a plurality of holes 27 being longer in one direction bored to stand in upper and lower two lines on the fitting plate 26 by which a belt pressing device 28 is mounted.

In FIGS. 11 and 12 there are shown the belt pressing device 28, and in a base plate having longer longitudinal sides there are bored a plurality of holes 30 longer in the lateral direction are stood in upper and lower two lines. On a pivot 31 securedly disposed in the center which is pivotal inwardly, a press roller 32 longer in the lateral direction is pivotally mounted.

The belt pressing device 28 is fitted to the frame 25 movable in the upward and the downward directions and right and left directions by inserting and securing bolts 33 to each holes 30 of its base plate 29 and each of holes 27 of the fitting plate 26 of the pressing frame 25. The tip end of the pressing roller 32 is placed substantially at the center of the pressing frame 25.

The belt 1 is gradually curved while it travels and passes through the first and the second rolling frames 21 and 23 to become approximately U-shaped. As shown in FIG. 10, only the inner side end portion 1" of the belt 1 is compulsory pressed from upward by the pressing roller 32 of the belt pressing device 28 to turn it to inner downward direction.

Accordingly, even if the amount of the materials 8 is excessively large, and even if materials to be carried are not fluid, the both side end portions 1' and 1" of the belt 1 are introduced into the supporting frame 4 arranged at the lower end of the conveyor, leaving an interval therebetween with each other. Accordingly, the inner surface of the side end portion 1' of the belt 1 can not be frictionally rubbed by the marginal end of the side end portion 1" of the belt 1, and further there is no occurence of bidding up portions 1' and 1".

The pressing roller 32 can be mounted at the most effective and convenient position according to the amount, quality and nature of the materials 8 to be carried by fixing the belt pressing device 28 to the most convenient place.

In addition, in the embodiment there are provided two rolling frames, however, more than three rolling frames can, of course, be provided, and it is also possible to provide, for example, five rolling-up rollers, in the rolling frame of the last stage, wherein if two rollers of the both sides among them are vertically arranged, effect of the rolling-up rollers is improved, and burden imposed on the belt pressing roller 32 is reduced.

With suitable means which are not shown in the drawings, particularly inclination of its up and downward direction can be varied. To perform the above described, it is easiest to change an angle of fitting the above base plate 29.

What is claimed is:

1. A tubular belt conveyor having a belt pressing device comprising:
   an endless belt able to be rolled to form an overlapped tubular shape;
   a plurality of spaced apart supporting frames each of which is disposed to surround outgoing and returning paths of said endless belt;
   a plurality of closely spaced belt shape maintaining rollers which are arranged to configure substantially a circle inside each of said supporting frames;
   and a belt pressing roller, disposed adjacent a conveyor loading station at one end of said conveyor between said station and the nearest supporting frame which pressedly bends one side end portion of said endless belt horizontally inwardly, and beneath the other side end portion, said belt pressing roller reduces frictional contact between said one side end portion and said other side end portion as the side end portions move laterally relative to each other during formation of the overlap by being positioned between said one side end portion and said other side end portion where said endless belt is to be rolled horizontally into said overlapped tubular shape; wherein said belt pressing roller is adjustable laterally of the belt and vertically, said belt pressing roller extends in a substantially horizontal direction laterally of the belt over said outgoing path of said endless belt on an upper side of the belt and a receptacle is provided to receive the materials carried adjacent the end of the outgoing path.

* * * * *